Figure 1:
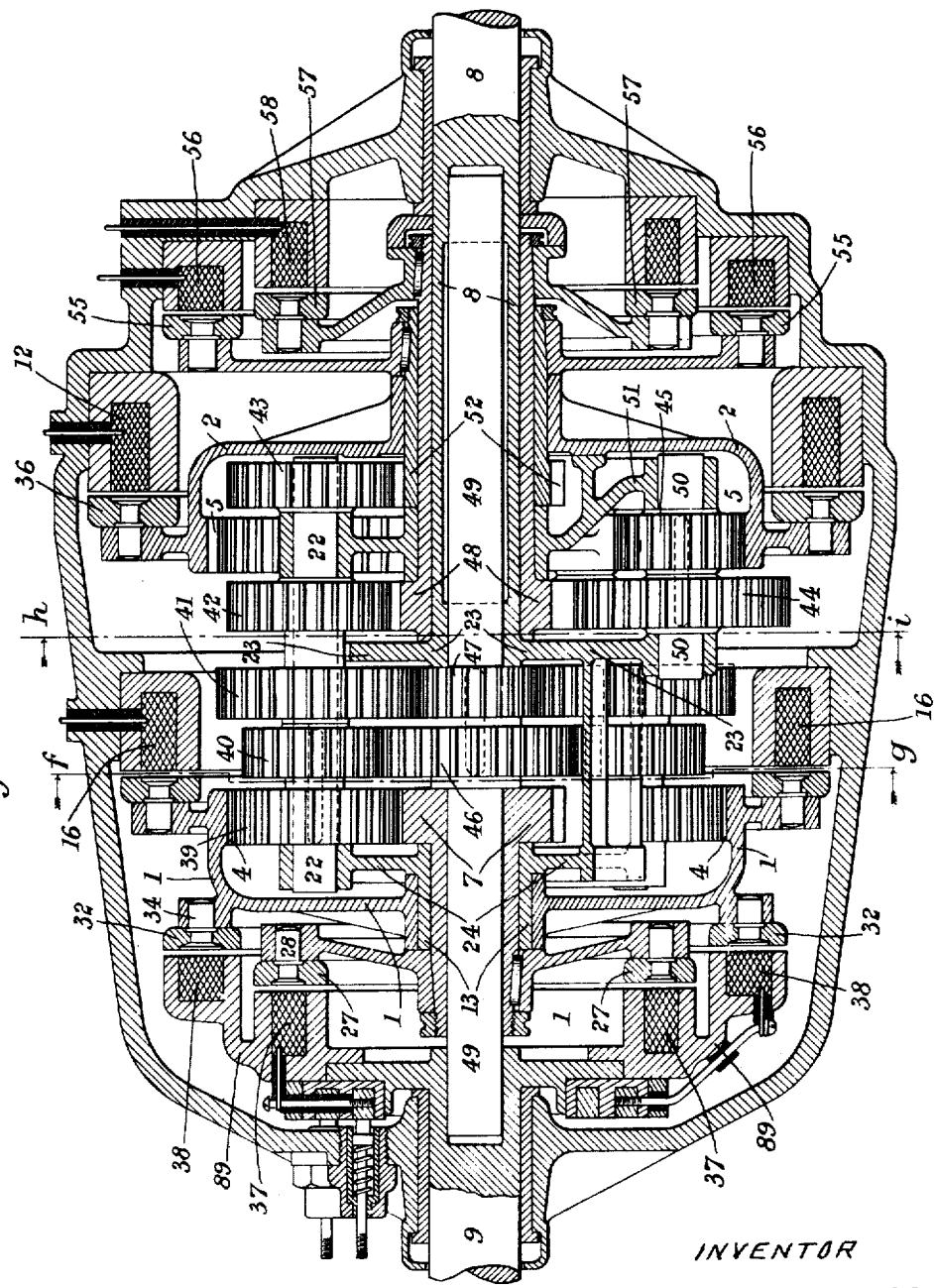

UNITED STATES PATENT OFFICE.

GEORGE POLLARD, OF PICCADILLY, LONDON, ENGLAND, ASSIGNOR TO MENCO-ELMA SYNDICATE LIMITED, OF LONDON, ENGLAND.

VARIABLE-SPEED GEARING.

1,231,529.   Specification of Letters Patent.   Patented June 26, 1917.

Original application filed August 18, 1915, Serial No. 46,179. Divided and this application filed June 13, 1916. Serial No. 103,576.

*To all whom it may concern:*

Be it known that I, GEORGE POLLARD, a subject of the King of Great Britain, residing at 8 Clarges street, Piccadilly, in the county of London, England, have invented new and useful Improvements in Variable-Speed Gearing, of which the following is a specification.

This invention relates to variable speed gearing of the epicyclic spur-wheel and pinion type and has for its object to provide an improved construction of variable speed gearing of the aforesaid type, which gearing is simple, efficient and compact and in which the various speeds can be brought into operation by stationary, or rotatable, or both stationary and rotatable electromagnetic clutches.

The gearing hereinafter described is constructed and arranged to form a single unit and is contained within a single gear-box, which may be divided longitudinally, or transversely, or both longitudinally and transversely and which gear is adapted to give two or more forward geared speeds, and a reverse speed the number of forward geared speeds being dependent on the number of sun-wheels, the number of electromagnetic clutches and the arrangement of the planetary system coöperating therewith.

According to my present invention the framework carrying the planetary system is supported by opposite members, one member being rigidly connected to the driven shaft and another member being supported on a sleeve on the driving shaft and in the present arrangement a compound planetary system is employed, together with a third shaft intermediate of the driving shaft and driven shaft.

The present application constitutes a division of my copending application Serial No. 46,179, filed August 18, 1915.

I will describe the invention with reference to the accompanying drawings but I do not limit myself to the construction described and illustrated nor to the number of forward geared speeds described with reference to the construction shown in the drawings as any desired number of forward speeds can be obtained by increasing the number of sun-wheels, or planet wheels, or both sun-wheels and planet wheels, and electro-magnetic controlling clutches.

Figure 2:
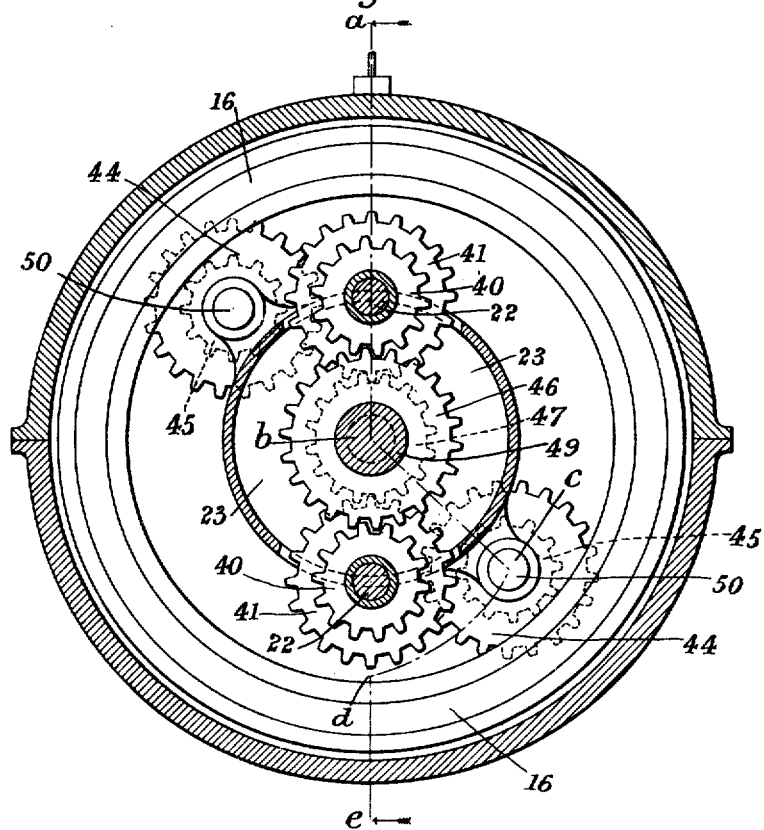
Figure 3:
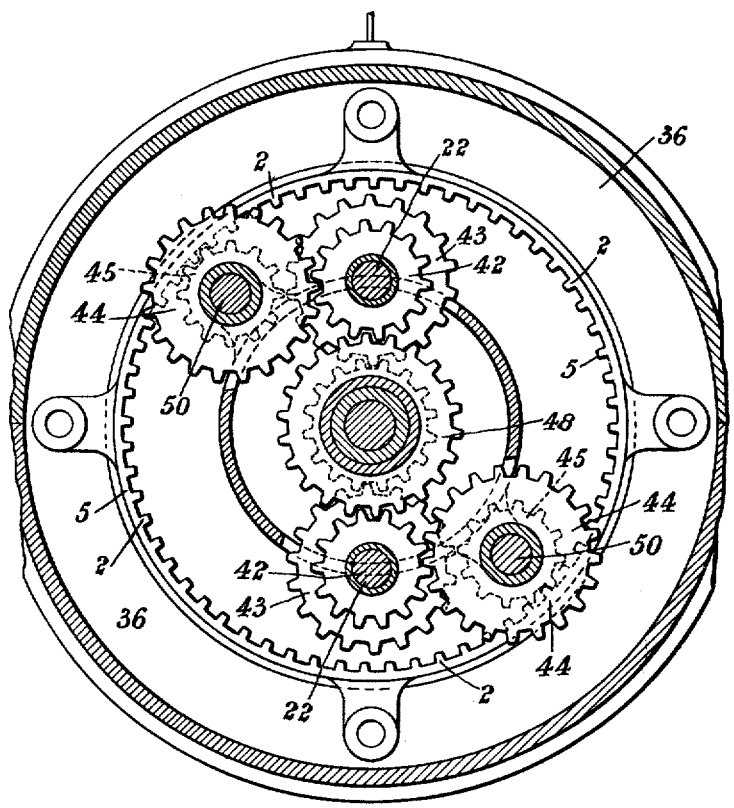

Figure 1 is a longitudinal section of a variable speed gear in accordance with this invention on the line $a, b, c, d, e$, Fig. 2. Fig. 2 is a cross-section on the line $f, g$, Fig. 1, and Fig. 3, is a cross-section on the line $h, i$, Fig. 1.

In this construction, a combination of rotatable and stationary electro-magnetic-clutches is employed, the stationary clutches which coöperate with the casings being marked 16 and 12. The rotatable electromagnetic clutches are marked 37 and 38, these clutches being carried by an annulus 89, integral with, or secured to the driving shaft 9. The armature of the clutch 37, is marked 27, which armature is secured to the driving wheel 7, and is capable of being rotated when the coil of the clutch 37, is energized. The casing 1, in Fig. 1, may be held stationary, or retarded, by the clutch 16, or may be rotated by the clutch 38, acting on the disk armature 32.

The planetary system shown in Fig. 1, comprises the pinions 39, 40, 41, 42, 43, 44 and 45, of which the following pairs are either formed *en bloc*, or secured together so as to rotate *en bloc*, these pairs are 39, and 40, 41 and 42, 44 and 45, the pinion 43, being keyed, or otherwise secured to the spindle 22. The planetary pinions are symmetrically arranged, relatively to the driving shaft, each set being diametrically opposite the other set, as shown in Figs. 2 and 3. The pinion 39, gears with the driving wheel 7, and with the internally toothed casing 1. Mounted on an intermediate shaft 49, are two spur wheels 46, 47, which gear with the planetary pinions 40, 41, the spur wheels 46, 47, being secured to the intermediate shaft 49, so as to rotate therewith. The pinions 42, gear with a spur wheel 48, secured to the armature 57, which spur wheel is rotatably mounted on the driven shaft 8, surrounding the intermediate shaft 49, and the pinions 44, gear with the pinions 42. The armature 57, can be controlled by the clutch 58. The pinion wheels 39, 40, 41, 42 and 43, are supported on the spindles 22, and the pinions 44, and 45, are supported by spindles 50, carried by the disk, or arms 23, and the arms 51. The pinion wheels 43, gear with the spur wheel 52, which is secured to the disk armature 55, capable of being held stationary by the clutch 56. The pinion wheels 45, gear at all times with the internally toothed casing 2, as shown in Figs. 1, 2 and 3. The arms or disks 23, 24, form the end walls of a casing having openings to accommodate the pinions 39 and 40, projections on the casing being provided to support one end of the spindle 50.

The first forward speed is obtained by energizing the coils of the clutches 37, and 16, so as to rotate the driving wheel 7, and retard, or hold stationary the internally toothed casing 1, the drive being then effected through the wheels 7, 39, internally toothed casing 1, thus causing the rotation of the planetary wheel frame, 23, 24, and thereby the hollow driven shaft 8. The second speed is effected by energizing the coil of the clutch 38, so as to rotate the casing 1, and through it the wheels 39, 40, and 42, which latter reacting against the wheel 48, which is held stationary by the clutch 58, energized simultaneously with the clutch 38, causes the planetary wheel frame to rotate and consequently the driven shaft, 8.

The third speed is effected by energizing clutches 38, and 56, so as to rotate the casing 1, and hold stationary the gear wheel 52, thus rotating the wheels 39 and 43, around the stationary gear wheel 52, and thereby rotating the planetary wheel frame 23, 24, and driven shaft 8. The direct drive is obtained by energizing clutches 37 and 38, thereby locking the casing 1, wheels 39 and 7, so that the planetary wheel-frame rotates with the same speed as the driving shaft.

The reverse drive is set in action by energizing clutches 37 and 12, so as to rotate the casing 1, and hold stationary casing 2, the casing 1, thus causing the wheels 39, to rotate and through them the wheels 46, 47, 41, 42, 44, 45, which latter acting against the casing 2, as an abutment causes the rotation of the planetary wheel frame and the driven shaft 8, in a direction opposite to that of the driving shaft 9.

Suitable ball bearings may be provided for all rotatable parts, and additional ball bearings may also be provided to take up the thrust of any, or all of the internally toothed casings.

Although the construction of the variable speed gear constructed as hereinbefore described is capable of giving three forward geared speeds, a direct forward drive, and a reverse, it is to be understood that any suitable number of forward geared speeds can be obtained, by increasing the number of wheels in the gearing and also the number of electro-magnetic clutches.

What I claim is:—

1. In a variable speed changing gear of the epicyclic spur wheel and pinion type, a driving member, a driven member, a carrier rigid with the driven member and freely supported with relation to the driving member, planet pinions mounted on said carrier and meshing with the driving member, controlling gears operatively engaging said planet pinions, means for selectively controlling said controlling gears, and rotary magnetic clutches operating upon the driving gear and a controlling gear to rotate the same in unison to effect a direct drive through the carrier to the driven member.

2. In a variable speed changing gear of the epicyclic spur wheel and pinion type, a driving shaft, a driven shaft, a shaft interposed between and supported by said driving and driven shafts, gears on said interposed shaft, a carrier fast with the driven shaft and free with relation to the driving shaft, planet pinions mounted on said carrier, meshing with the gears on the interposed shaft, a driving gear on said interposed shaft meshing with the planet pinion system and internal controlling gears meshing with the planet pinions, substantially as described.

3. In a variable speed changing gear of the epicyclic spur wheel and pinion type, a driving shaft, a driven shaft, a carrier rigid with the driven shaft and free with relation to the driving shaft, planet pinions mounted on said carrier, secondary planetary gears operated by said planet pinions, abutment gears meshing with said secondary planetary gears, electro-magnetic brakes for selectively controlling said abutment gears, and means associated with the driving shaft for driving the planet pinions.

4. In a variable speed changing gear of the epicyclic spur wheel and pinion type, a driving shaft, a driven shaft, a carrier rigid with the driven shaft and free with relation to the driving shaft, planet pinions mounted on said carrier, secondary planetary gears operated by said planet pinions, abutment gears meshing with said secondary planetary gears, electro-magnetic brakes for selectively controlling said abutment gears, and electro-magnetically controlled.

5. In a variable speed changing gear of the epicyclic spur wheel and pinion type, a driving shaft, a driven shaft, a carrier rigid with the driven shaft and free with relation to the driving shaft, planet pinions mounted on said carrier, secondary planetary gears operated by said planet pinions, abutment gears meshing with said secondary planetary gears, electro-magnetic brakes for selectively controlling said abutment gears, and duplex rotary electro-magnets rigid with relation to the driving shaft and driving gears operatively associated with said electro-magnets for driving the planet gears.

6. In a variable speed changing gear of the epicyclic spur wheel and pinion type, a driving shaft, a plurality of separate driving magnets rotating with the driving shaft, a corresponding plurality of separate driving gears operatively associated with said driving magnets, a driven shaft, a carrier rigid with said driven shaft, planetary pinions mounted on said carrier and operatively associated with the driving gears, a series of abutment gears engaging certain of said planetary pinions, and electro-magnetic means for selectively controlling said abutment gears substantially as described.

In testimony whereof I have signed my name to this specification in the presence of two subscribing witnesses.

GEORGE POLLARD.

Witnesses:
W. W. ANDERSON,
R. BOWYER.

Copies of this patent may be obtained for five cents each, by addressing the "Commissioner of Patents, Washington, D. C."